(12) United States Patent
Ooki

(10) Patent No.: US 9,038,126 B2
(45) Date of Patent: May 19, 2015

(54) DEVICE AND METHOD OF CONTROLLING AND SWITCHING TERMINALS PROVIDED WITH SPECIFIC COMMUNICATION SYSTEMS AMONG A PLURALITY OF STANDARD COMMUNICATION SYSTEM

(75) Inventor: Yasuomi Ooki, Kawasaki (JP)

(73) Assignee: NEC Platforms, Ltd., Kanagawa (JP)

( * ) Notice: Subject to any disclaimer, the term of this patent is extended or adjusted under 35 U.S.C. 154(b) by 1104 days.

(21) Appl. No.: 12/696,791

(22) Filed: Jan. 29, 2010

(65) Prior Publication Data

US 2010/0199335 A1 Aug. 5, 2010

(30) Foreign Application Priority Data

Jan. 30, 2009 (JP) ................. 2009-019965

(51) Int. Cl.
*G06F 17/00* (2006.01)
*H04L 29/08* (2006.01)
*G06F 21/31* (2013.01)
*H04L 29/06* (2006.01)

(52) U.S. Cl.
CPC ..... *H04L 67/141* (2013.01); *H04M 2215/7263* (2013.01); *H04M 2215/725* (2013.01); *G06F 21/316* (2013.01); *H04L 63/083* (2013.01)

(58) Field of Classification Search
CPC ............... H04M 2215/7263; H04M 2215/725; H04L 167/141
USPC .......................................................... 726/1
See application file for complete search history.

(56) References Cited

U.S. PATENT DOCUMENTS

| | | | | |
|---|---|---|---|---|
| 7,437,457 B1* | 10/2008 | Eisendrath et al. | ........... | 709/225 |
| 8,151,107 B2* | 4/2012 | Song et al. | .................... | 713/155 |
| 2002/0138737 A1* | 9/2002 | Schulz | ......................... | 713/182 |
| 2004/0187036 A1* | 9/2004 | Nakamura | ................... | 713/202 |

FOREIGN PATENT DOCUMENTS

| | | | |
|---|---|---|---|
| JP | 2000-209284 A | | 7/2000 |
| JP | 2007-058502 A | | 3/2007 |

(Continued)

OTHER PUBLICATIONS

Yahoo Answers, 2008, retrieved from the Internet <URL: answers.yahoo.com/question/index?qid=20080802123516AAwglyS>, pp. 1-3 as printed.*

(Continued)

*Primary Examiner* — Michael Chao
(74) *Attorney, Agent, or Firm* — Sughrue Mion, PLLC

(57) ABSTRACT

A method for controlling and switching terminals includes a writing step and a logoff step. In the writing step, when there is a connection request from a given terminal, a processor of a switching device writes, into a memory, user identification information, a password, identification information of a communication system, and an IP address and port number so that their information and data are associated with one another. In the logoff step, if the same user identification information, password, and identification information of communication system as the above are already written in the memory, the processor logs off the other terminal that has the IP address and port number that are already so written in the storage unit as to be associated with the user identification information, the password, and the identification information of communication system.

18 Claims, 9 Drawing Sheets

| 501 | 502 | 503 | |
|---|---|---|---|
| SWITCHING DEVICE USER ID | SWITCHING DEVICE USER PASSWORD | COMMUNICATION SYSTEM:ADDRESS:PORT | |
| EXAMPLE: user A | EXAMPLE: user A Pass | EXAMPLE: VOICE | EXAMPLE: 111.111.111.001:Port100 |
| | | EXAMPLE: VIDEO | EXAMPLE: 111.111.111.002:Port101 |
| EXAMPLE: user B | EXAMPLE: user B Pass | EXAMPLE: VOICE | EXAMPLE: 111.111.111.003:Port100 |
| | | EXAMPLE: VIDEO | EXAMPLE: 111.111.111.003:Port101 |

(56) References Cited

FOREIGN PATENT DOCUMENTS

| JP | 2008-160693 A | 7/2008 |
|---|---|---|
| JP | 2008-182646 A | 8/2008 |

OTHER PUBLICATIONS

Gamespot Forum, May 2008, Retrieved from the Internet <URL: gamespot.com/world-of-warcraft/forum/can-two-people-play-on-the-same-account-43102004/>, pp. 1-3 as printed.*

World of Wacraft website login, 2006, retrieved from the Internet <URL: web.archive.org/web/20061110075941/https://www.worldofwarcraft.com/login/login?service=https%3A%2F%2Fwww.worldofwarcraft.com%2Faccount%2Findex.html>, pp. 1-2 as printed.*

Firewalls and hosting games, 2008, Blizzard, Retrieved from the Internet <URL: forums.battle.net/thread.html?topicId=10863439009>, pp. 1-6 as printed.*

(No stated author); Cisco Extension Mobility, OL-12529-01; 2007; Retrieved from the Internet <URL: cisco.com/c/en/us/td/docs/voice_ip_comm/cucm/admin/6_0_1/ccmfeat/cmfsgd601.html>; pp. 1-26 as printed.*

Houri et al.; Sametime (TM) Community—Client Protocol; 2000; Retrieved from the Internet <URL: http://tools.ietf.org/html/draft-houri-sametime-community-client-00>; pp. 1-43 as printed.*

* cited by examiner

FIG.5

| SWITCHING DEVICE USER ID (501) | SWITCHING DEVICE USER PASSWORD (502) | COMMUNICATION SYSTEM:ADDRESS:PORT (503) | |
|---|---|---|---|
| EXAMPLE: user A | EXAMPLE: user A Pass | EXAMPLE: VOICE | EXAMPLE: 111.111.111.001:Port100 |
| | | EXAMPLE: VIDEO | EXAMPLE: 111.111.111.002:Port101 |
| EXAMPLE: user B | EXAMPLE: user B Pass | EXAMPLE: VOICE | EXAMPLE: 111.111.111.003:Port100 |
| | | EXAMPLE: VIDEO | EXAMPLE: 111.111.111.003:Port101 |

FIG.6

| SWITCHING DEVICE USER ID | SWITCHING DEVICE USER PASSWORD | AVAILABLE COMMUNICATION SYSTEM:ADDRESS:PORT | SELECTED COMMUNICATION SYSTEM |
|---|---|---|---|
| EXAMPLE: user A | EXAMPLE: user A Pass | EXAMPLE:<br>VOICE:111.111.111.001:Port 100<br>VIDEO:111.111.111.001:Port 101 | EXAMPLE: VOICE & VIDEO |

601 602 603 604

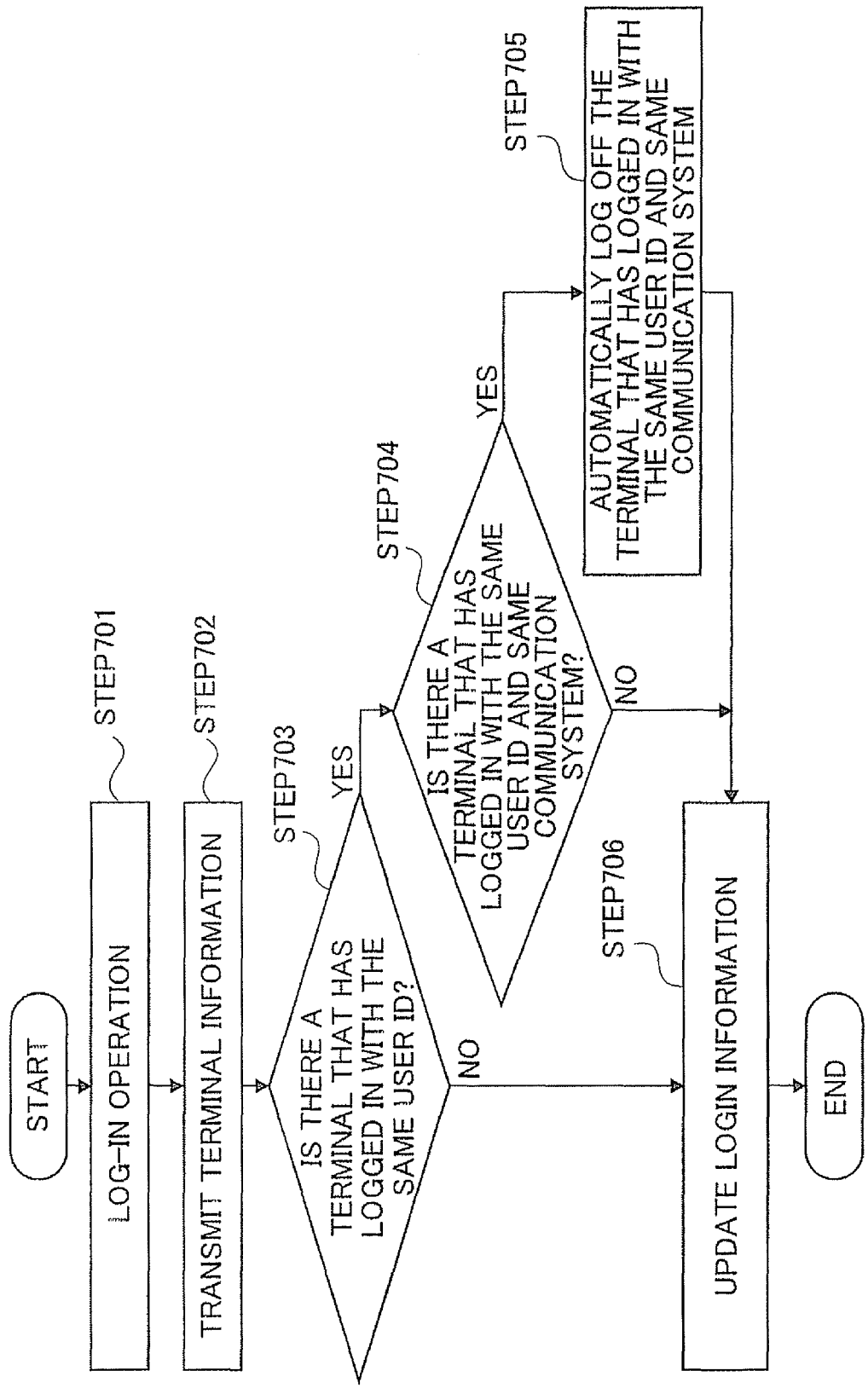

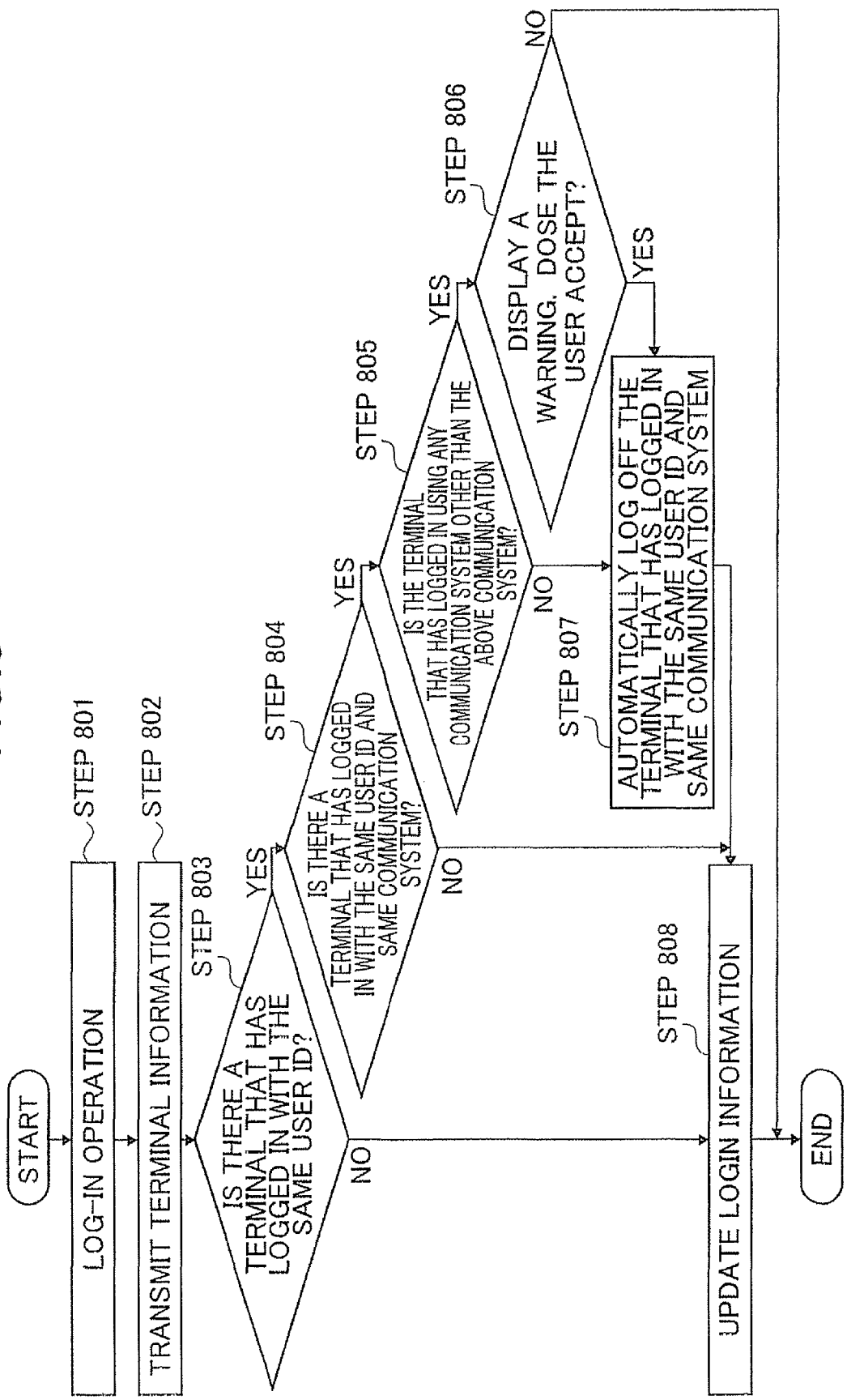

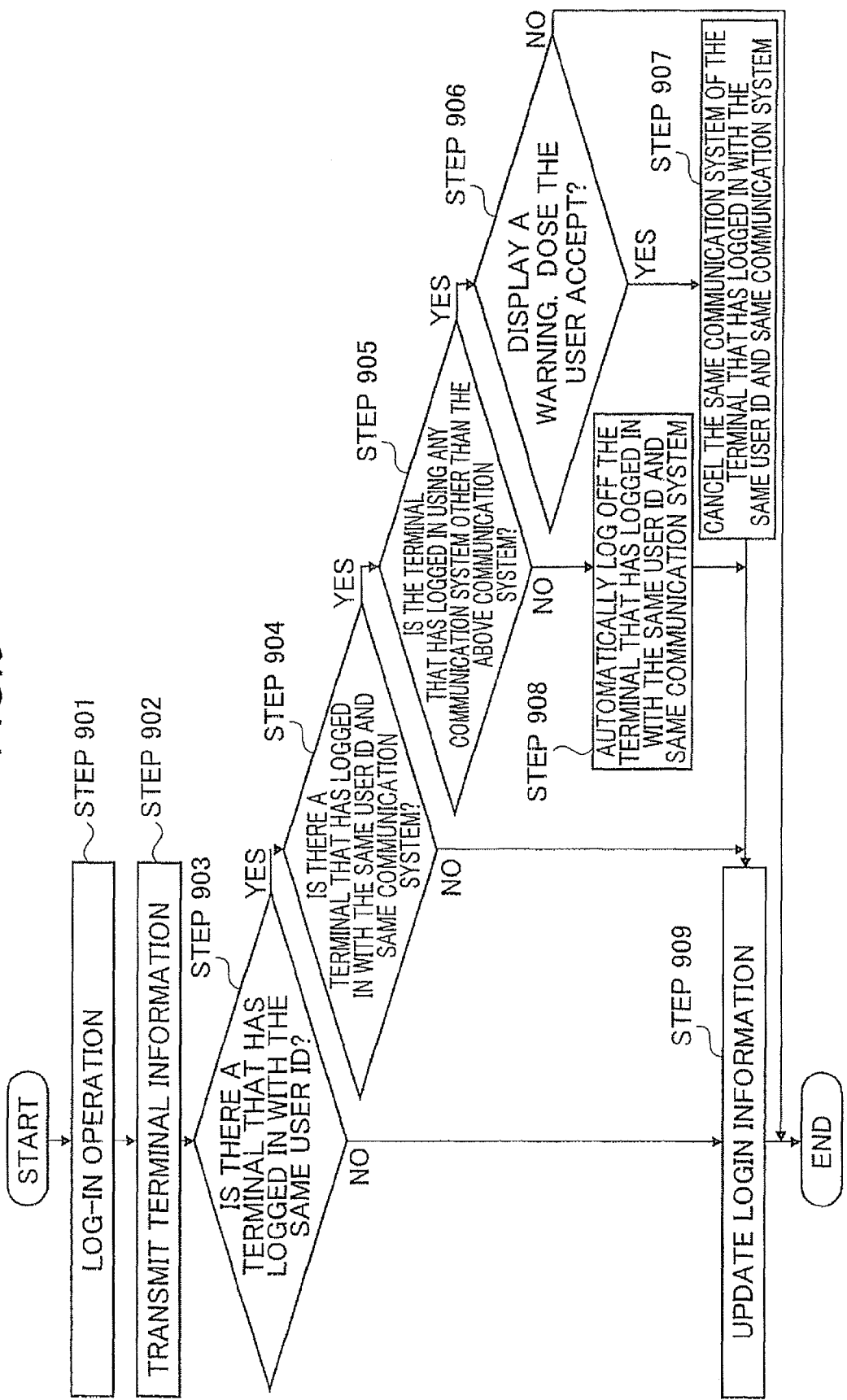

DEVICE AND METHOD OF CONTROLLING AND SWITCHING TERMINALS PROVIDED WITH SPECIFIC COMMUNICATION SYSTEMS AMONG A PLURALITY OF STANDARD COMMUNICATION SYSTEM

TECHNICAL FIELD

The present invention relates to a communication system-decentralized terminal accommodating switching device that accommodates communication system-decentralized terminals and to a communication system-decentralized terminal control method. Here, the communication system-decentralized terminal is a terminal that has a part of a plurality of communication systems which are originally put together in one terminal.

BACKGROUND ART

In recent years, the means of communication has diversified. Various kinds of communication have become available, including not only conventional voice communication but also video communication, text communication (mail, instant message, chat, and the like), file-sharing communication, whiteboard-sharing communication, and application-sharing communication.

Moreover, when communication systems are provided to users for such kinds of communication, cases have emerged in which, instead of all communication systems being put together in one type of terminal, a part (one or more) of types of terminal is used in combination in accordance with features of the terminals.

For example, a communication system that requires, like video communication, a high resolution and a moving image processing capability is offered as application on PC (Personal Computer); a communication system that can have a lower processing capability like voice communication but requires stability is offered on a dedicated terminal like a telephone.

When a plurality of terminals are used appropriately as described above, the terminals that the same user uses are often linked to each other by inputting into the terminals an ID that identifies a user, such as a user ID, to provide a sense of usability that makes the user feel that the user uses one terminal.

CITATION LIST

Patent Literature

{PTL 1} JP-A-2000-209284
{PTL 2} JP-A-2007-058502
{PTL 3} JP-A-2008-160693
{PTL 4} JP-A-2008-182646

SUMMARY OF INVENTION

Technical Problem

However, as the terminals have advanced in capability, the terminals that the user uses may have the same communication systems. In such cases, the problem is that it is unclear which terminal is used for a given communication system.

Therefore, an object of the present invention is to provide a communication system-decentralized terminal accommodating switching device and communication system-decentralized terminal control method that can prevent the terminals from having the same communication system.

Solution to Problem

According to the present invention, there is provided a communication system-decentralized terminal accommodating switching device, including a writing unit for writing, when there is a connection request from a given terminal, user identification information of the terminal, a password corresponding to the identification information, identification information of a communication system that the terminal is equipped with, and an IP address and port number that the terminal uses for the communication system in a storage unit so that the user identification information, the password, the identification information of the communication system, the IP address and the port number are associated with one another; and a logoff unit for logging off, when the same user identification information, password, and identification information of communication system as the above are already so written in the storage unit as to be associated with one another, the other terminal that has the IP address and port number that are already so written in the storage unit as to be associated with the user identification information, the password, and the identification information of communication system.

Moreover, according to the present invention, there is provided a communication system-decentralized terminal control method, including a writing step of writing, when there is a connection request from a given terminal, user identification information of the terminal, a password corresponding to the identification information, identification information of a communication system that the terminal is equipped with, and an IP address and port number that the terminal uses for the communication system in a storage unit so that the user identification information, the password, the identification information of the communication system, the IP address and the port number are associated with one another; and a logoff step of logging off, when the same user identification information, password, and identification information of communication system as the above are already so written in the storage unit as to be associated with one another, the other terminal that has the IP address and port number that are already so written in the storage unit as to be associated with the user identification information, the password, and the identification information of communication system.

Advantageous Effects of Invention

According to the present invention, while the login state of the other terminal that the same user currently uses is not affected, only the terminal having the same communication system is to be replaced for use.

BRIEF DESCRIPTION OF DRAWINGS

FIG. 5 A conceptual diagram illustrating the configuration of a database illustrated in FIG. 3.

FIG. 6 A conceptual diagram illustrating the configuration of a user setting data section inside a terminal illustrated in FIG. 4.

FIG. 7 A flowchart illustrating a login process performed by the system illustrated in FIG. 1.

FIG. 8 A flowchart illustrating another login process performed by the system illustrated in FIG. 1.

FIG. 9 A flowchart illustrating another login process performed by the system illustrated in FIG. 1.

DESCRIPTION OF EMBODIMENTS

Hereinafter, embodiments of the present invention will be described in detail with reference to the accompanying drawings.

Figure 1:
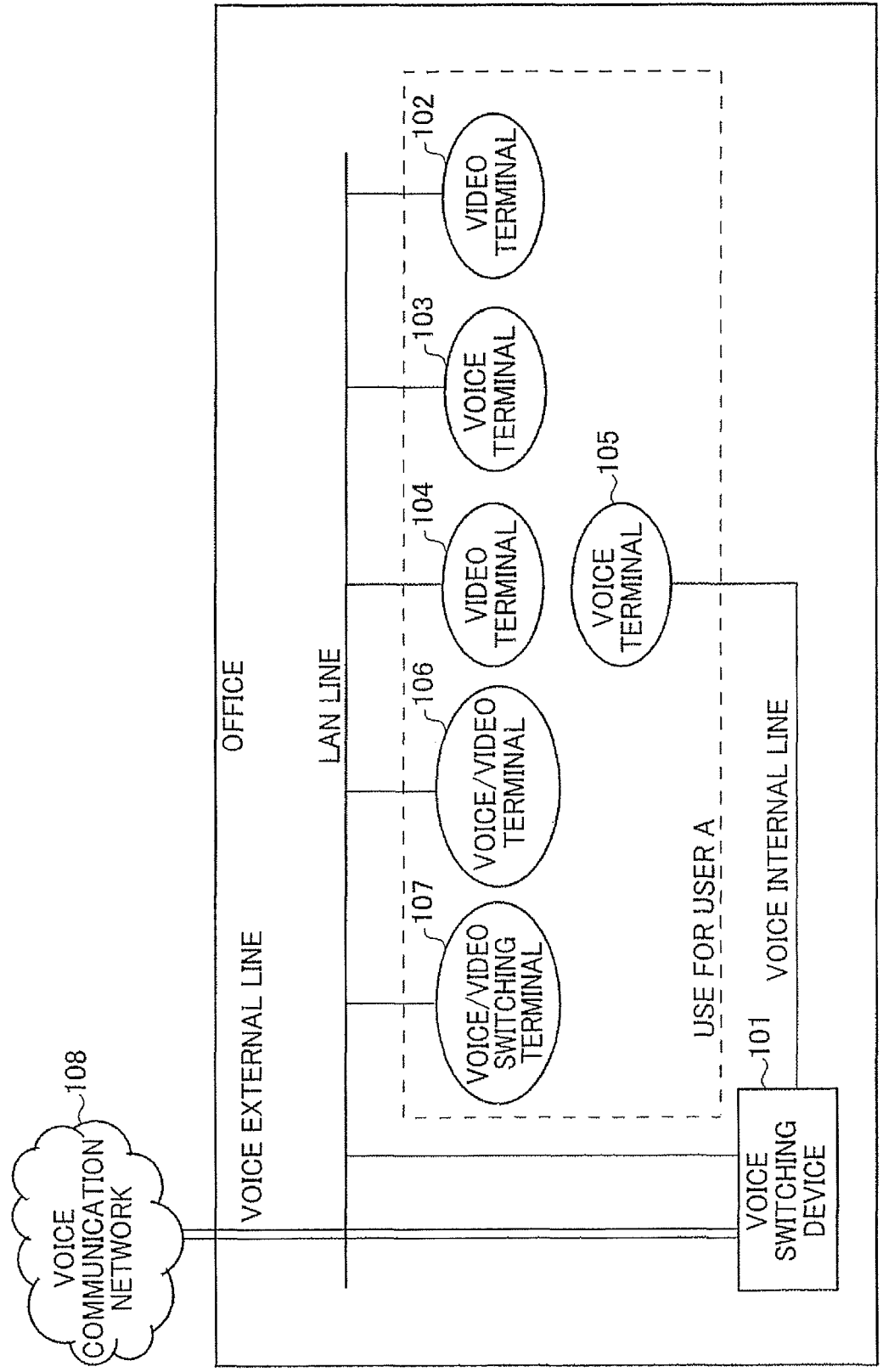
FIG. 1 A block diagram illustrating the configuration of a system including a voice switching device and various terminals according to an embodiment of the present invention.

As shown in FIG. 1, the configuration in which a voice line (internal/external line) and a LAN line are used in an office is described here as an embodiment of the present invention. An example of video communication is used to explain an example of the communication system realized by P2P communication software.

In the office, there are a switching device 101, which switches voice communication; video terminals 102 and 104, which are connected to the LAN line and used by a user A; a voice terminal 103; a voice/video terminal 106; a voice/video switching terminal 107; and a voice terminal 105, which is connected to the voice internal line. The voice/video terminal here is a terminal that can simultaneously use a voice communication system and a video communication system. The voice/video switching terminal is a terminal that cannot simultaneously use the voice communication system and the video communication system and can use only one of the communication systems at one time.

Moreover, the voice switching device 101 is connected to a voice communication network 108 via the voice external line.

The switching device 101 communicates with the voice communication network 108 and each of the terminals 102 to 107 and controls the voice communication connections of the voice communication network 108 and the terminals 102 to 107.

Figure 2:
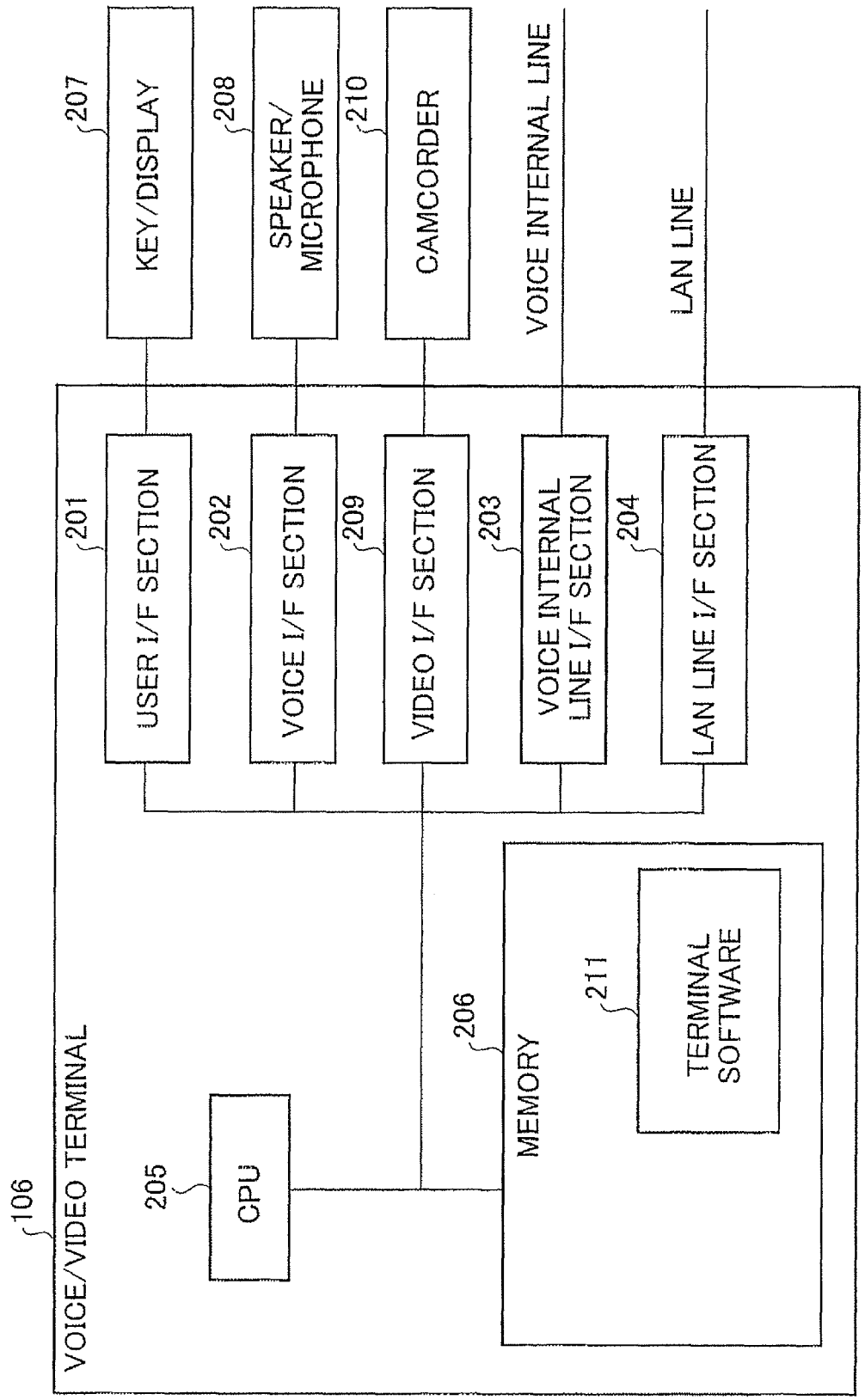
FIG. 2 A block diagram illustrating the internal configuration of a voice/video terminal illustrated in FIG. 1.

As shown in FIG. 2, each section of the voice/video terminal 106 works as described below in general. A user I/F section 201 receives input signals from keys, a mouse and the like that are connected to the user I/F section 201 and outputs video signals to a display. A voice I/F section 202 transmits or receives voice data to or from a speaker/microphone 208 that is connected to the voice I/F section 202. A voice internal line I/F section 203 transmits or receives signals to or from the voice communication line. A LAN line I/F section 204 transmits or receives signals to or from the LAN line. CPU 205 takes overall control of the terminal. A memory 206 is used as working area for use of software and data which are necessary to control the terminal. Terminal software 211 is stored in the memory 206 and is executed by the CPU 205. A video I/F section 209 receives input signals from a camcorder that is connected to the video I/F section 209.

The basic structure of the voice terminals 103 and 105, video terminals 102 and 104, and the voice/video switching terminal 107 is the same as that of the voice/video terminal 106. The voice terminals 103 and 105, video terminals 102 and 104, and the voice/video switching terminal 107 can be formed by omitting part of the functional sections or adding necessary functional sections.

Figure 3:
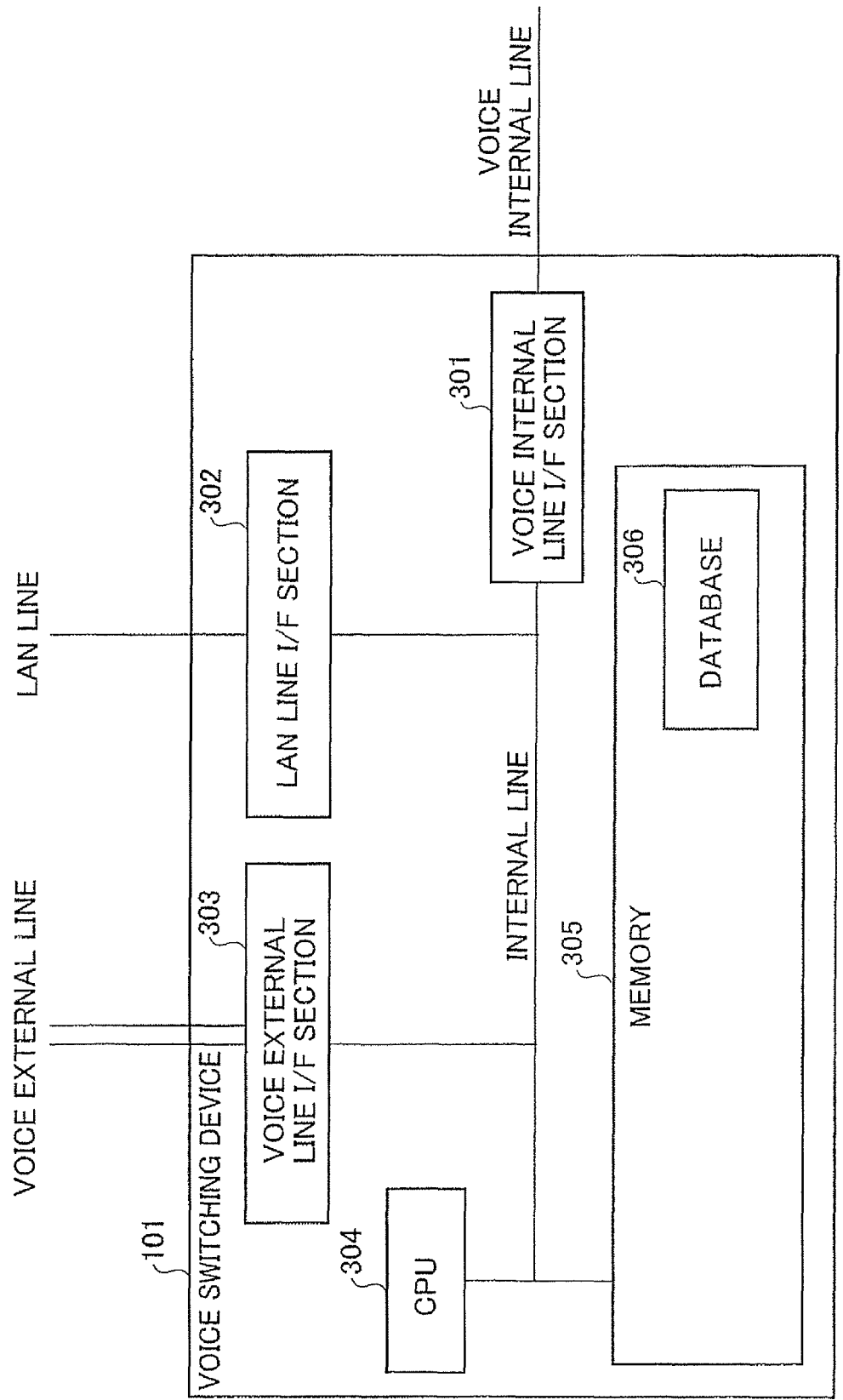
FIG. 3 A block diagram illustrating the internal configuration of the voice switching device illustrated in FIG. 1.

As shown in FIG. 3, each section of the voice switching device 101 works as described below in general. A voice internal line I/F section 301 transmits or receives signals to or from the voice communication line. A LAN line I/F section 302 transmits or receives signals to or from the LAN line. A voice external line I/F section 303 transmits or receives signals to or from the voice external line. CPU 304 takes overall control of the switching device 101. A memory 305 is used as working area for use of software and data which are necessary to control the switching device 101. A database 306 is an area that holds various kinds of setting data stored in the memory 305.

Figure 4:
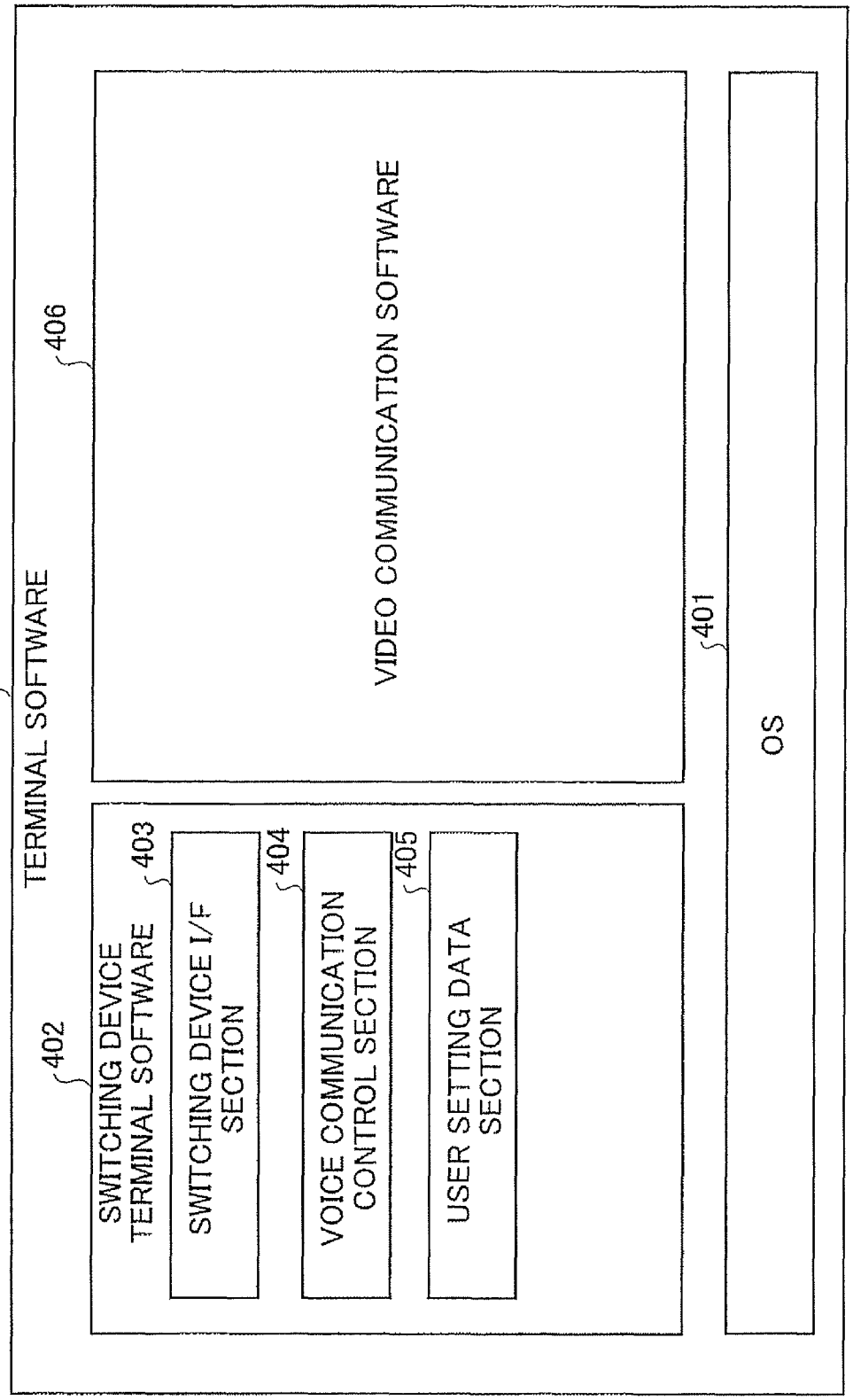
FIG. 4 A conceptual diagram illustrating the configuration of terminal software illustrated in FIG. 2.

FIG. 4 is a diagram illustrating the configuration of modules of the software 211 stored in the memory 206 of the voice/video terminal. Switching device terminal software 402 and video communication software 406 are application software that runs on OS (Operating System) 401.

The switching device terminal software 402 consists of various kinds of software modules. An switching device I/F section 403 controls communication with the switching device 101. A voice communication control section 404 communicates with the voice I/F section 202, the voice internal line I/F section 203, and the LAN line I/F section 204 to control communication of voice signals. A user setting data section 405 stores a user ID and password of a user who uses the terminal, information about a person with whom the user currently communicates, and the like.

The video communication software 406 is general-purpose P2P communication software and includes a video communication capability in the present embodiment. The terminals on which the video communication software is installed perform a communication start process, a video data transmitting/receiving process, and a communication end process among the terminals. The other software installed on the same terminals includes a function to receive address information from communication counterparts and start communication for the address.

FIG. 5 shows the contents of the database 306 stored in the memory 305 of the voice switching device 101. In a switching device user ID 501, ID information of users who use the switching device is stored. In a switching device user password 502, passwords corresponding to the user IDs are stored. A communication system/address/port 503 is an area where, as for the communication systems that are currently available to the terminal used by the user, the address of the terminal and the port numbers that the communication systems use on the terminal are stored. If there are a plurality of communication systems currently available to the terminal, a plurality of pieces of information are stored.

FIG. 6 shows the contents of the terminal software 211 stored in the memory 206 of the voice/video terminal. In a switching device user ID 601, switching device user IDs of users who use the terminal are stored. In a switching device user password 602, passwords corresponding to the user IDs are stored. An available communication system/address/port 603 is an area where the communication systems that are available to the terminal, the address of the terminal, and the port numbers that the communication systems use on the terminal are stored. If the terminal supports a plurality of communication systems, a plurality of pieces of information are stored. If the terminal is the one that is connected to the voice line, extension numbers are stored instead of addresses and port numbers. In a selected communication system 604, the communication systems that the users select are stored.

The following describes the operation of the present embodiment in detail.

With reference to a flowchart illustrated in FIG. 7, the case in which while using the video terminal 102, the user A logs in to another video terminal 104 will be described.

The premise here is that in the sections of the available communication system/address/port 603 of the video terminals 102 and 104, only the addresses and ports for video communication are stored. Moreover, in the selected communication system 604, only the video communication systems are stored.

The user A inputs the user ID and the password using the keys and the display 207 of the video terminal 102 (Step 701).

The switching device terminal software 402 that runs on the CPU 205 and the memory 206 of the video terminal 102 receives the information through the user I/F section 201 and the OS 401. The input user ID is stored in the section 601, and the password is stored in the section 602. Along with the information of the communication system/address/port 603 that corresponds to the communication system stored in the selected communication system 604 of the video terminal 102, the user ID and the password are transferred to the OS 401 through the switching device I/F section 403, and then transmitted to the switching device through the LAN line I/F section 204 (Step 702).

After receiving the information at the LAN line I/F section 302, the switching device searches the switching device user ID 501 of the database 306 inside the switching device for the received user ID and confirms whether the password recorded in the section 502 of the hit area and the received password are the same. If it is confirmed that the passwords are the same, the switching device confirms whether the address/port information of the other terminal that currently logs in is recorded in the section 503 of the same area (Step 703).

In this case, since there is not any terminal, other than the video terminal 102, that logs in with the same user ID, the address/port information of the video communication system is not stored in the section 503. Therefore, the received communication system/address/port information is just to be stored in the section 503 (Step 706).

Then, the user A inputs the user ID and the password using the keys and the display 207 of the video terminal 104 (Step 701).

The switching device terminal software 402 that runs on the CPU 205 and the memory 206 of the video terminal 104 receives the information through the user I/F section 201 and the OS 401. The input user ID is stored in the section 601, and the password is stored in the section 602. Along with the information of the communication system/address/port 603 that corresponds to the communication system stored in the selected communication system 604 of the video terminal 104, the user ID and the password are transferred to the OS 401 through the switching device I/F section 403, and then transmitted to the switching device through the LAN line I/F section 204 (Step 702).

After receiving the information at the LAN line I/F section 302, the switching device searches the switching device user ID 501 of the database 306 inside the switching device for the received user ID and confirms whether the password recorded in the section 502 of the hit area and the received password are the same. If it is confirmed that the passwords are the same, the switching device confirms whether the information of the other terminal that currently logs in is recorded in the section 503 of the same area (Step 703).

In this case, the information of the video terminal 102 that has earlier logged in is stored in the section 503. Therefore, the switching device confirms whether the address/port information is in the video communication system section 503 of the same area (step 704).

In the video communication system section 503, the address/port information of the video terminal 102 has been already recorded. Therefore, using the LAN line I/F section 302, the switching device transmits a log-off notice to the address recorded in the section 503, or to the video terminal 102. The video terminal 102 receives the log-off notice at the switching device I/F section 403 through the LAN line I/F section 204 via the OS 401. The switching device I/F section 403 switches the internal state from log-in state to log-off state, and informs the user through the user I/F section 201 that the video terminal 102 has logged off (Step 705).

Then, the switching device overwrites the stored address/port information of the video terminal 102 with the received address/port information (Step 706).

In the present embodiment, the example of video communication as communication system is used for description. However, the communication system is not limited to video communication in particular. By switching the video communication software 406 to arbitrary communication software, various kinds of communication system, including voice communication, mail communication, instant message communication, file-sharing communication, whiteboard-sharing communication, and application-sharing communication, can be applied.

The following describes another embodiment of the present embodiment.

The above-described embodiment is about switching between the terminals that can select a single communication system. However, the terminals that can select a plurality of communication systems may also be used.

Such a case will be described with reference to a flowchart shown in FIG. 8.

The case in which while using the voice/video terminal 106, the user A logs in to another video terminal 104 will be described.

The premise here is that in the section of the available communication system/address/port 603 of the voice/video terminal 106, the address and port for video communication and the address and port for voice communication are stored; in the selected communication system 604, the video and voice communication systems are stored. Moreover, in the section of the available communication system/address/port 603 of the video terminal 104, only the address and port for video communication are stored; in the selected communication system 604, only the video communication system is stored.

The user A inputs the user ID and the password using the keys and the display 207 of the voice/video terminal 106 (Step 801).

The switching device terminal software 402 that runs on the CPU 205 and the memory 206 of the voice/video terminal 106 receives the information through the user I/F section 201 and the OS 401. The input user ID is stored in the section 601, and the password is stored in the section 602. Along with the information of the communication system/address/port 603 that corresponds to the communication system stored in the selected communication system 604 of the voice/video terminal 106, the user ID and the password are transferred to the OS 401 through the switching device I/F section 403, and then transmitted to the switching device through the LAN line I/F section 204 (Step 802).

After receiving the information at the LAN line I/F section 302, the switching device searches the switching device user ID 501 of the database 306 inside the switching device for the received user ID and confirms whether the password recorded in the section 502 of the hit area and the received password are the same. If it is confirmed that the passwords are the same, the switching device confirms whether the information of the other terminal that currently logs in is recorded in the section 503 of the same area (Step 803).

In this case, since there is not any terminal, other than the voice/video terminal 106, that logs in with the same user ID, the address/port information of the voice and video communication systems is not stored in the section 503. Therefore, the address/port information of the received communication system is just to be stored in the section 503 (Step 808).

Then, the user A inputs the user ID and the password using the keys and the display 207 of the video terminal 104 (Step 801).

The switching device terminal software 402 that runs on the CPU 205 and the memory 206 of the video terminal 104 receives the information through the user I/F section 201 and the OS 401. The input user ID is stored in the section 601, and the password is stored in the section 602. Along with the information of the communication system/address/port 603 that corresponds to the communication system stored in the selected communication system 604 of the video terminal 104, the user ID and the password are transferred to the OS 401 through the switching device I/F section 403, and then transmitted to the switching device through the LAN line I/F section 204 (Step 802).

After receiving the information at the LAN line I/F section 302, the switching device searches the switching device user ID 501 of the database 306 inside the switching device for the received user ID and confirms whether the password recorded in the section 502 of the hit area and the received password are the same. If it is confirmed that the passwords are the same, the switching device confirms whether the information of the other terminal that currently logs in is recorded in the section 503 of the same area (Step 803).

In this case, the information of the voice/video terminal 106 that has earlier logged in is stored in the section 503. Therefore, the switching device confirms whether the address/port information is in the video communication system section 503 of the same area (step 804).

In the video communication system section 503, the address/port information of the voice/video terminal 106 has been already recorded. Therefore, the switching device checks the address of the corresponding area. Then, the switching device searches to check if there is another address stored in the section 503 of the same user ID 501. The result of searching is a hit because the address of the voice communication system of the voice/video terminal 106 is also the same. After checking the communication system section 503 of the hit area, the switching device confirms that the voice communication system stored is not the received communication system (Step 805).

Accordingly, using the LAN line I/F section 302, the switching device transmits to the voice/video terminal 106 a warning notice that not only the video communication but the voice communication that the voice/video terminal 106 currently uses will be unavailable after logoff. The voice/video terminal 106 receives the warning notice at the switching device I/F section 403 through the LAN line I/F section 204 via the OS 401. The switching device I/F section 403 informs the user about the warning through the user I/F section 201. In the example here, the user is assumed to agree to logoff. After the user A inputs an agreement response using the keys and the display 207 of the voice/video terminal 106, the switching device terminal software 402 that runs on the CPU 205 and the memory 206 of the voice/video terminal 106 receives the information through the user I/F section 201 and the OS 401. Then, the switching device terminal software 402 transfers the information via the user I/F section 201 and the OS 401 to the OS 401 through the switching device I/F section 403, and transmits the information to the switching device through the LAN line I/F section 204 (Step 806).

Then, the switching device I/F section 403 switches the internal state from log-in state to log-off state, and informs the user through the user I/F section 201 that the voice/video terminal 106 has logged off (Step 807).

After receiving the user's agreement response at the LAN line I/F section 302, the switching device deletes the information of all the areas of the section 503 where the address of the video terminal 102 is stored. Then, the switching device stores the communication system/address/port information of the video terminal 104 in the section 503 (Step 808).

Therefore, even if the user uses the terminal that supports a plurality of communication systems, the present invention can be applied.

The following describes another embodiment of the present invention.

The above-described embodiment is about automatic logoff of the terminal that uses the same communication system. However, only the same communication system may be cancelled without logoff.

Such a case will be described with reference to a flowchart shown in FIG. 9.

The case in which while using the voice/video terminal 106, the user A logs in to another video terminal 104 will be described.

The premise here is that in the section of the available communication system/address/port 603 of the voice/video terminal 106, the address and port for video communication and the address and port for voice communication are stored; in the selected communication system 604, the video and voice communication systems are stored. Moreover, in the section of the available communication system/address/port 603 of the video terminal 104, only the address and port for video communication are stored; in the selected communication system 604, only the video communication system is stored.

The user A inputs the user ID and the password using the keys and the display 207 of the voice/video terminal 106 (Step 901).

The switching device terminal software 402 that runs on the CPU 205 and the memory 206 of the voice/video terminal 106 receives the information through the user I/F section 201 and the OS 401. The input user ID is stored in the section 601, and the password is stored in the section 602. Along with the information of the communication system/address/port 603 that corresponds to the communication system stored in the selected communication system 604 of the voice/video terminal 106, the user ID and the password are transferred to the OS 401 through the switching device I/F section 403, and then transmitted to the switching device through the LAN line I/F section 204 (Step 902).

After receiving the information at the LAN line I/F section 302, the switching device searches the switching device user ID 501 of the database 306 inside the switching device for the received user ID and confirms whether the password recorded in the section 502 of the hit area and the received password are the same. If it is confirmed that the passwords are the same, the switching device confirms whether the information of the other terminal that currently logs in is recorded in the section 503 of the same area (Step 903).

In this case, since there is not any terminal, other than the voice/video terminal 106, that logs in with the same user ID, the address/port information of the voice and video communication systems is not stored in the section 503. Therefore, the address/port information of the received communication system is just to be stored in the section 503 (Step 909).

Then, the user A inputs the user ID and the password using the keys and the display 207 of the video terminal 104 (Step 901).

The switching device terminal software 402 that runs on the CPU 205 and the memory 206 of the video terminal 104 receives the information through the user I/F section 201 and the OS 401. The input user ID is stored in the section 601, and the password is stored in the section 602. Along with the information of the communication system/address/port 603 that corresponds to the communication system stored in the selected communication system 604 of the video terminal 104, the user ID and the password are transferred to the OS 401 through the switching device I/F section 403, and then transmitted to the switching device through the LAN line I/F section 204 (Step 902).

After receiving the information at the LAN line I/F section 302, the switching device searches the switching device user ID 501 of the database 306 inside the switching device for the received user ID and confirms whether the password recorded in the section 502 of the hit area and the received password are the same. If it is confirmed that the passwords are the same, the switching device confirms whether the information of the other terminal that currently logs in is recorded in the section 503 of the same area (Step 903).

In this case, the information of the voice/video terminal 106 that has earlier logged in is stored in the section 503. Therefore, the switching device confirms whether the address/port information is in the video communication system section 503 of the same area (step 904).

In the video communication system section 503, the address/port information of the voice/video terminal 106 has been already recorded. Therefore, the switching device checks the address of the corresponding area. Then, the switching device searches to check if there is another address stored in the section 503 of the same user ID 501. The result of searching is a hit because the address of the voice communication system of the voice/video terminal 106 is also the same. After checking the communication system section 503 of the hit area, the switching device confirms that the voice communication system stored is not the received communication system (Step 905).

Accordingly, using the LAN line I/F section 302, the switching device transmits to the voice/video terminal 106 a warning notice that the video communication is switched to the other terminal. The voice/video terminal 106 receives the warning notice at the switching device I/F section 403 through the LAN line I/F section 204 via the OS 401. The switching device I/F section 403 informs the user about the warning through the user I/F section 201. In the example here, the user is assumed to agree to switching. After the user A inputs an agreement response using the keys and the display 207 of the voice/video terminal 106, the switching device terminal software 402 that runs on the CPU 205 and the memory 206 of the voice/video terminal 106 receives the information through the user I/F section 201 and the OS 401. Then, the switching device terminal software 402 transfers the information via the user I/F section 201 and the OS 401 to the OS 401 through the switching device I/F section 403, and transmits the information to the switching device through the LAN line I/F section 204 (Step 906).

After that, the switching device I/F section 403 transmits to the video communication software 406 the instruction to cancel the video communication function. Then, the switching device I/F section 403 informs the user through the user I/F section 201 that the video communication is cancelled (Step 907).

After receiving the user's agreement response at the LAN line I/F section 302, the switching device overwrites the stored address/port information of the same communication system of the video terminal 102 with the communication system/address/port information that is received at the time of login (Step 909).

Therefore, even if some of the communication systems are the same when a plurality of communication system terminals are being used, it is possible to switch only the same communication system to the other terminal without logging off all the terminals.

REFERENCE SIGNS LIST

101: Voice switching device
102: Video terminal
103: Voice terminal
104: Video terminal
105: Voice terminal
106: Voice/video terminal
107: Voice/video switching terminal

The invention claimed is:

1. A device for switching terminals provided with specific communication systems among a plurality of certain communication systems the device comprising:
    a processor and a memory containing a list of logged in terminals, comprising username and password combinations and a list of supported communication types comprising one or more of: voice communication system, a video communication system, a text communication system, a file-sharing communication system, a whiteboard-sharing system and an application-sharing communication system; wherein,
    when the switching device receives a connection request from a first terminal, the processor checks the list of the logged terminals to determine if there exists a second terminal that has logged in with a same user identification information as that of the first terminal and with a same password as that of the first terminal;
    (A) if the second terminal does not exist, the processor writes, into the list of logged in terminals, user identification information of the first terminal, a password corresponding to the identification information, and identification of communication type that the first terminal is equipped with, so that the user identification information, the password, and the identification of the communication types are associated with one another to record the first terminal as in log-in state; and
    (B) if the second terminal exists, the processor further confirms whether the second terminal has logged in with any of the same communication types as that of the first terminal by inspecting the list of logged in terminals; and
    (C) the processor logs off the second terminal even when the second terminal is engaged in a different kind of communication system from the already written communication system out of the already written user identification information, password and communication system.

2. The device according to claim 1, wherein
    the processor sends to the second terminal a notice that the communication type which the second terminal is engaged in will be unavailable even when the second terminal is engaged in a different communication type from the first terminal, and
    the processor logs off the second terminal when the terminal receives an approval information to the notice after the second terminal displays the notice.

3. The device according to claim 1, wherein
the processor sends to the second terminal a notice that the communication type which the second terminal is engaged in will be unavailable even when the second terminal is engaged in a different communication type from the first terminal, and
the processor does not log off the second terminal when the terminal receives a refusal information to the notice after the second terminal displays the notice.

4. The device according to claim 1, wherein
the processor logs off the second terminal when the second terminal is not engaged in a different communication type from the first terminal.

5. The device according to claim 1, wherein
the processor does not log off the second terminal when the second terminal has not logged in with any of the same communication types as that of the first terminal.

6. A device for switching terminals provided with specific communication systems among a plurality of certain communication systems, the device comprising:
a processor and a memory containing a list of logged in terminals, comprising username and password combinations and a list of supported communication types comprising one or more of: voice communication system, a video communication system, a text communication system. a file-sharing communication system, a whiteboard-sharing system and an application-sharing communication system; wherein,
when the switching device receives a connection request from a first terminal, the processor checks the list of the logged terminals to determine if there exists a second terminal that has logged in with a same user identification information as that of the first terminal and with a same password as that of the first terminal;
(A) if the second terminal does not exist, the processor writes, into the list of logged in terminals user identification information of the first terminal, a password corresponding to the identification information, and identification of communication types that the first terminal is equipped with, so that the user identification information, the password, and the identification of the communication types are associated with one another to record the first terminal as in log-in state; and
(B) if the second terminal exists, the processor further confirms whether the second terminal has logged in with any of the same communication types as that of the first terminal by inspecting the list of logged in terminals; and
(C) the processor cancels only the communication types of the second terminal identified by the communication types of the request from the first terminal and the communication system does not log off the second terminal when the second terminal is engaged in a different communication type from the first terminal, and the communication system logs off the second terminal when the second terminal is not engaged in a different communication type from the first terminal.

7. The device according to claim 6, wherein
the processor sends to the second terminal a notice that the terminal which uses the communication types of the request from the first terminal changes when the second terminal is engaged in the different communication type from the first terminal, and
the processor cancels only the communication types of the second terminal identified by the communication types of the request from the first terminal when the second terminal receives an approval information to the notice after the second terminal displays the notice.

8. The device according to claim 6, wherein
the processor sends to the second terminal a notice that the terminal which uses the communication types of the request from the first terminal changes when the second terminal is engaged in the different communication type from the first terminal, and
the processor does not cancel the communication types of the second terminal identified by the communication types of the request from the first terminal when the second terminal receives a refusal information to the notice after the second terminal displays the notice.

9. The device according to claim 6, wherein
the processor does not log off the second terminal when the second terminal has not logged in with any of the same communication types as that of the first terminal and does not cancel the communication types of the second terminal identified by the communication types of the request from the first terminal.

10. A method of controlling terminals provided with specific communication systems among a plurality of certain communication systems by a switching device comprising a processor and a memory containing a list of logged in terminals, comprising username and password combinations and a list of supported communication types comprising one or more of: voice communication system, a video communication system, a text communication system, a file-sharing communication system, a whiteboard-sharing communication system and an application-sharing communication system, the method comprising:
the processor checking the list of logged terminals to determine if there exists a second terminal that has logged in with a same user identification information as that of a first terminal and with a same password as that of the first terminal, when the switching device receives a connection request from the first terminal;
(A) if the second terminal does not exist, the processor writing, into the list of logged in terminals the user identification information of the first terminal, a password corresponding to the identification information, and identification of communication types that the terminal is equipped with so that the user identification information, the password, and the identification of the communication types are associated with one another to record the given terminal as in log-in state;
(B) if the second terminal exists, the processor further confirming whether the second terminal has logged in with any of the same communication types as that of the first terminal by inspecting the list of logged in terminals; and
(C) the processor logging off the second terminal even when the second terminal is engaged a different kind of communication system from the already written communication system out of the already written user identification information, password and communication system.

11. The method according to claim 10, wherein
the processor sends to the second terminal a notice that the communication type which the second terminal is engaged in will be unavailable even when the second terminal is engaged in a different communication type from the first terminal, and
the processor logs off the second terminal when the terminal receives an approval information to the notice after the second terminal displays the notice.

12. The method according to claim 10, wherein
the processor sends to the second terminal a notice that the communication type which the second terminal is engaged in will be unavailable even when the second terminal is engaged in a different communication type from the first terminal, and
the processor does not log off the second terminal when the terminal receives a refusal information to the notice after the second terminal displays the notice.

13. The method according to claim 10, wherein
the processor logs off the second terminal when the second terminal is not engaged in a different communication type from the first terminal.

14. The method according to claim 10, wherein
the processor does not log off the second terminal when the second terminal has not logged in with any of the same communication types as that of the first terminal.

15. A method of controlling terminals provided with specific communication systems among a plurality of certain communication systems by a switching device comprising a processor and a memory containing a list of logged in terminals, comprising username and password combinations and a list of supported communication types comprising one or more of: voice communication system, a video communication system, a text communication system, a file-sharing communication system, a whiteboard-sharing communication system and an application-sharing communication system, the method comprising:
the processor checking the list of logged terminals to determine if there exists a second terminal that has logged in with a same user identification information as that of a first terminal and with a same password as that of the first terminal, when the switching device receives a connection request from the first terminal;
(A) if the second terminal does not exist, the processor writing, into the list of logged in terminals the user identification information of the first terminal, a password corresponding to the identification information, and identification of communication types that the terminal is equipped with so that the user identification information, the password, and the identification of the communication types are associated with one another to record the given terminal as in log-in state;
(B) if the second terminal exists, the processor further confirming whether the second terminal has logged in with any of the same communication types as that of the first terminal by inspecting the list of logged in terminals; and
(C) the processor cancelling only the communication types of the second terminal identified by the communication types of the request from the first terminal and the communication system not logging off the second terminal when the second terminal is engaged in a different communication type from the first terminal, and the communication system logging off the second terminal when the second terminal is not engaged in a different communication type from the first terminal.

16. The method according to claim 15, wherein
the processor sends to the second terminal a notice that the terminal which uses the communication types of the request from the first terminal changes when the second terminal is engaged in the different communication type from the first terminal, and
the processor cancels only the communication types of the second terminal identified by the communication types of the request from the first terminal when the second terminal receives an approval information to the notice after the second terminal displays the notice.

17. The method according to claim 15, wherein
the processor sends to the second terminal a notice that the terminal which uses the communication types of the request from the first terminal changes when the second terminal is engaged in the different communication type from the first terminal, and
the processor does not cancel the communication types of the second terminal identified by the communication types of the request from the first terminal when the second terminal receives a refusal information to the notice after the second terminal displays the notice.

18. The method according to claim 15, wherein
the processor does not log off the second terminal when the second terminal has not logged in with any of the same communication types as that of the first terminal and does not cancel the communication types of the second terminal identified by the communication types of the request from the first terminal.

* * * * *